W. J. A. BAILEY.
ANTISKIDDING DEVICE FOR TIRES.
APPLICATION FILED MAY 26, 1917.
1,350,484.
Patented Aug. 24, 1920.
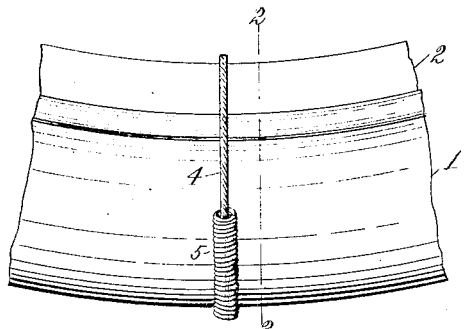
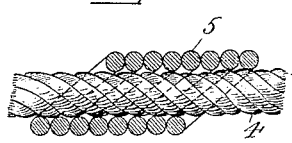
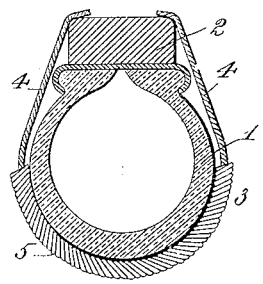
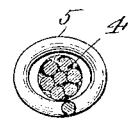
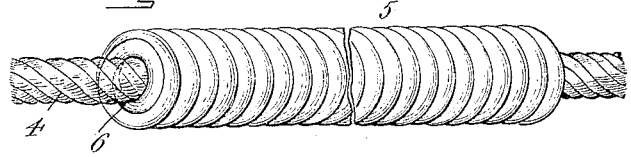
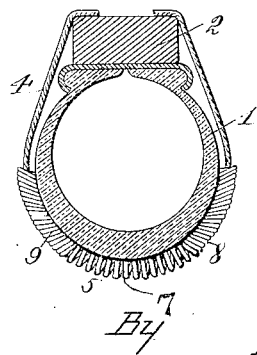
INVENTOR=
William J. A. Bailey
By Coale & Hayes
HIS ATTORNEYS=

UNITED STATES PATENT OFFICE.

WILLIAM J. A. BAILEY, OF BOSTON, MASSACHUSETTS, ASSIGNOR, BY MESNE ASSIGNMENTS, TO NON SKID COMPANY OF AMERICA, OF BOSTON, MASSACHUSETTS, A CORPORATION OF MASSACHUSETTS.

ANTISKIDDING DEVICE FOR TIRES.

1,350,484.      Specification of Letters Patent.     Patented Aug. 24, 1920.

Application filed May 26, 1917. Serial No. 171,263.

*To all whom it may concern:*

Be it known that I, WILLIAM J. A. BAILEY, of Boston, in the county of Suffolk and State of Massachusetts, a citizen of the United States, have invented a new and useful Improvement in Antiskidding Devices for Tires, of which the following is a full, clear, and exact description, reference being had to the accompanying drawings, forming a part of this specification, in explaining its nature.

The present invention relates to an antiskidding device for tires and especially the tires of motor vehicles. The general purpose of the device is to prevent slippage and obtain proper traction under all circumstances especially in mud and snow.

Among the essential objects of my invention is to provide a device of the above character having a relatively long-lived wearing or road-engaging part; to provide, also, a device in which the wearing part engages the road at a plurality of points with a gripping contact for guarding against lateral slippage; to provide a wearing part capable of continuing to perform its function even in case of the accidental breakage of such part, and to provide, also, a wearing part more or less conformable to obstructions and possessing a certain amount of resiliency thereby overcoming the objection of rough or uneven riding, especially when the device is made of sufficient size to obtain proper traction.

My invention can best be seen and understood by reference to the drawings in which I have shown it applied to the tire of an automobile, only such parts being shown as are necessary to a proper understanding of the invention, and in which—

Figure 1 is a side elevation of a portion of a tire with the device applied thereto.

Fig. 2 is a section on line 2—2 of Fig. 1.

Fig. 3 is a cross section of the device.

Fig. 4 is a longitudinal section of the device.

Fig. 5 is a plan, and

Fig. 6 is the same as Fig. 2 except for a slightly modified structure of the device.

In the drawings:—

1 represents a section of tire, 2 the rim and 3 the non-skidding device embodying my invention.

The non-skidding device comprises a cross-retaining member 4 and a road-engaging member 5.

The cross-retaining member 4 is preferably a flexible member and one of great tensile strength. A wire rope makes a very satisfactory cross-retaining member. For ordinary purposes a three-eighths inch rope is sufficient. The member is extended crosswise around the face of the tire and its ends are secured to the wheel (not shown) on which the rim is arranged or to the rim itself by any suitable means of fastening (not shown).

Arranged upon the cross-retaining member 4 forming a core is a metal coil with closely wound convolutions and consisting preferably of tough spring wire. The coil forms the road-engaging member 5 and accordingly has such extension as to cover such parts of the cross-retaining member as would otherwise have wearing contact with the road. In practice I prefer to cover with the coil substantially that entire portion of the cross-retaining member extending around and over the tread face of the tire in order that the cross retaining member may be protected and its original strength maintained without being weakened by abrasion or otherwise.

One very satisfactory method of covering the cross retaining member is by slipping thereon a tough spring wire having closely wound convolutions. This wire is held in place by binding the ends 6 of its outer convolutions against the cross retaining member or wire rope. Experience has demonstrated, also, the advisability of upsetting all the convolutions by the application of pressure tending to flatten and bind them against the cross retaining member (see Fig. 3).

In order to better prevent the opening of the convolutions during service and also to obtain better resiliency, a satisfactory embodiment of my invention is obtained by upsetting the convolutions to overlap one another substantially as shown in Figs. 2 and 4. A further very satisfactory embodiment of my invention is obtained by flattening the central series of convolutions 7 or those which lie immediately beneath the central part of the tread of the tire and then upsetting, to overlap one another in reverse directions, those series of convolutions 8 and 9, respectively, which lie on opposite sides of the center substantially as shown in Fig. 6.

According to the construction and operation of the device it will be seen that the coil is the only part that engages directly with the road, and is of a character to withstand long wear. The various convolutions present separate engaging points with the road, thus creating an effective grip for preventing lateral slippage. The convolutions, closely wound as they are, present a combined surface which will not injure the tire. There is practically no tendency for the convolutions to open when the coil is bent into arcuate form due to the heaviness of the wire and the fact that the coil is composed of closely wound convolutions. In any event any tendency for the outer portions of the coil to open is very slight and insufficient to prevent the coil acting as a proper protection or armor to the cross member or core especially when the convolutions are flattened or upset (see Fig. 4). Should any part or parts of the coiled wire break in service it does not materially weaken or lessen the usefulness of the coil as a wearing and road-engaging part. The separate parts or convolutions will still continue to grip the wire rope or core and perform their original functions. Though having considerable stiffness to withstand a heavy blow and take it off the tire, yet the device possesses a certain amount of corformability and also a remarkable degree of elasticity. This elasticity results from the employment of a coil of spring wire as a cover for the cross member or core and which elasticity is increased by upsetting the convolutions of the coil to overlap one another as above indicated and which in practice practically eliminates vibration upon the vehicle. The upsetting of the convolutions to overlap one another, apart from giving increased elasticity or resiliency to the device, enables the convolutions forming the coil to present a larger wearing surface than they would otherwise do and also enables them to support one another when pressure is brought to bear upon them.

The construction shown in Fig. 6 possesses special adaptability in that the convolutions cannot be disrupted by an upwardly wiping blow as, for example, by the lateral engagement thereof with a curb. In such case, owing to the reverse bend of the convolutions, the resulting force brought to bear upon the convolutions from either side can exert no disrupting influence and will be deflected, the convolutions being only flattened.

Having thus fully described my invention, I claim and desire to secure by Letters Patent of the United States:—

1. An anti-skid for tires comprising a cross-retaining member extending crosswise over the tread face of the tire, and a road-engaging, wear-resisting element comprising a metal coil mounted upon said cross-retaining member with closely wound convolutions flattened against said cross-retaining member.

2. An anti-skid for tires comprising a cross-retaining member extending crosswise over the tread face of the tire, and a road-engaging, wear-resisting element comprising a metal coil mounted upon said cross-retaining member with closely wound convolutions upset to overlap one another.

3. An anti-skid for tires comprising a cross-retaining member extending crosswise over the tread face of the tire, and a road-engaging, wear-resisting element comprising a metal coil having closely wound convolutions mounted upon said cross member, and which convolutions also are flattened and otherwise upset to overlap one another.

4. An anti-skid for tires comprising a cross-retaining member extending crosswise over the tread face of the tire, and a road-engaging, wear-resisting element comprising a metal coil mounted upon said cross-retaining member with closely wound convolutions upset to overlap one another, the convolutions lying on opposite sides of the center of the coil being upset in reverse directions.

WILLIAM J. A. BAILEY.